United States Patent [19]

Higgins et al.

[11] 4,266,852
[45] May 12, 1981

[54] FIBER OPTICS WELDER HAVING MOVABLE ALIGNING MIRROR

[75] Inventors: Robert W. Higgins, Los Alamos; Roger E. Robichaud, Jemez Springs, both of N. Mex.

[73] Assignee: The United States of America as represented by the United States Department of Energy, Washington, D.C.

[21] Appl. No.: 11,018

[22] Filed: Feb. 9, 1979

[51] Int. Cl.³ .................... G02B 5/14; B23K 9/00
[52] U.S. Cl. .................... 350/96.20; 65/4 B; 219/121 PX
[58] Field of Search ............ 350/96.15, 96.20, 96.21, 350/320, 25, 26, 81; 65/48, 40, 152; 219/57, 58, 121 R, 121 PX

[56] References Cited

U.S. PATENT DOCUMENTS

| | | | |
|---|---|---|---|
| 3,810,802 | 5/1974 | Buhite et al. | 350/96.20 X |
| 3,877,778 | 4/1975 | Heller | 350/25 |
| 3,902,784 | 9/1975 | Dakss et al. | 350/96.21 X |
| 3,914,880 | 10/1975 | Dakss et al. | 350/96.21 |
| 3,999,841 | 12/1976 | Dakss et al. | 350/320 |
| 4,049,414 | 9/1977 | Smith | 65/4 B |
| 4,118,618 | 10/1978 | Gauthier et al. | 219/121 P |

FOREIGN PATENT DOCUMENTS

| | | | |
|---|---|---|---|
| 2611658 | 9/1977 | Fed. Rep. of Germany | 350/96.21 |
| 2710995 | 9/1977 | Fed. Rep. of Germany | 350/81 |
| 2704140 | 8/1978 | Fed. Rep. of Germany | 350/96.20 |
| 2,721,991 | 11/1978 | Fed. Rep. of Germany | 350/96.20 |

OTHER PUBLICATIONS

Fujita et al., "Optical Fiber Splicing Technique With a $CO_2$ Laser", *Applied Optics*, vol. 15, No. 2, Feb. 1976, pp. 320-321.
Kohanzadeh, "Hot Splices of Optical Waveguide Fibers", *Applied Optics*, vol. 15, No. 3, Mar. 1976, pp. 793-795.
Bisbee, "Splicing Silica Fibers With An Electric Arc", *Applied Optics*, vol. 15, No. 3, Mar. 1976, pp. 796-798.
Hatakeyama et al., "Fusion Splices For Optical Fibers by Discharge Heating", *Applied Optics*, vol. 17, No. 12, Jun. 1978, pp. 1959-1964.
Hatakeyama et al., "Fusion Splices For Single-Mode Optical Fibers,", *IEEE J. Q. E.*, vol. QE-14, No. 8, Aug. 1978, pp. 614-619.

*Primary Examiner*—John K. Corbin
*Assistant Examiner*—John D. Lee
*Attorney, Agent, or Firm*—John A. Koch; Dean E. Carlson; James E. Denny

[57] ABSTRACT

A system for welding fiber optic waveguides together. The ends of the two fibers to be joined together are accurately, collinearly aligned in a vertical orientation and subjected to a controlled, diffuse arc to effect welding and thermal conditioning. A front-surfaced mirror mounted at a 45° angle to the optical axis of a stereomicroscope mounted for viewing the junction of the ends provides two orthogonal views of the interface during the alignment operation.

2 Claims, 4 Drawing Figures

FIBER OPTICS WELDER HAVING MOVABLE ALIGNING MIRROR

BACKGROUND OF THE INVENTION

The invention described herein was made in the course of Contract No. EY-76-C-08-1183 with the U.S. Department of Energy.

This invention relates to fiber optic waveguides, commonly called optical fibers or filaments, and more particularly to a system for welding two lengths of such fibers together.

The advent of commercially available optical fibers has stimulated much interest in their use in systems concerning the transmission of intelligence-bearing signals from one location to another. Since the transmission of light through optical fibers provides inherently greater information-carrying capacity than the transmission of radio frequency waves through coaxial cables, the use of optical fibers to transmit intelligence-bearing signals in place of coaxial cables is, potentially, very attractive.

However, one of the problems associated with the use of optical fibers has been in joining together the discrete lengths of fibers obtained from fiber manufacturers to provide a fiber of appropriate length, and with satisfactory transmission characteristics, for particular applications. A number of mechanical connections have been developed to provide junctions of one or more optical fiber pairs. However, these connectors suffer from alignment and physical shortcomings that produce junctions having high and unpredictable signal losses.

Accurate mechanical alignment of colinearly oriented fibers for optical signal transmission requires encapsulation of the small-diameter (50- to 200-micron) glass fibers within microscopically drilled retaining cores that are precisely centered. The fibers must be restrained to prevent optical decoupling at the fiber junction, and the fiber ends are generally immersed in index-matching fluid to enhance signal transmission across the junction interface. The connectors are necessarily bulky and cumbersome devices that cannot physically match the size of the fiber filaments.

Fused junctions should provide more efficient and reliable signal transmission. However, the accurate alignment of the fibers preparatory to welding posed difficult problems and, in addition, previous welding systems produced junctions having signal loss characteristics of unpredictable variability. These unpredictable characteristics have been found to be due to the horizontal orientation of fibers during fusion. The horizontal orientation subjected the fibers to convective thermal and geophysical effects during the fusion process. These microscopic forces become instrumental factors in bending and warping the unsupported and weakened portions of the fibers as they are heated and fusion is initiated.

BRIEF SUMMARY OF THE INVENTION

Accordingly, it is an object of the invention to provide a system for connecting optical fibers together which overcomes many of the difficulties associated with prior art systems. Another object of the invention is to provide a system for welding optical fibers.

Briefly summarized, the above and additional objects are accomplished by accurately colinearly aligning the ends of the two fibers to be joined in a vertical orientation and subjecting the fibers to a controlled, diffuse arc to effect welding and thermal conditioning of the fibers. It has been found that fiber colinearity can be maintained more easily in vertical orientation, and the fusion region of the optical fibers will remain optically straight during and after the weld. These characteristics prevent the loss of higher mode optical signals in the weld region, thereby producing efficient, low-loss transmission through the junction.

The accurate alignment of the two fiber ends is accomplished by clamping one fiber end in a holding means having a fixed location; clamping the second fiber end in a second holding means which can be accurately moved with respect to the first holding means and precisely aligning the second fiber to the first while viewing the two ends to be joined together through a stereoscopic microscope. The second holding means is mounted to a three-axis micropositioner to enable the accurate positioning of the second fiber to the first.

A movable, front-surfaced mirror mounted at a 45° angle with respect to the microscope optical axis is provided to give a right orthogonal view of the fibers during the alignment of the two fibers. Once colinearity between the fibers is established, the mirror is retracted and optical reference is relegated to the frontal stereoscopic view afforded by the stereomicroscope.

Initial operation with fusion welding techniques for producing low-loss optically coupled junctions relied on monocular viewing of the fiber elements. Colinearity of the fiber elements was checked along one of the three principal axes by use of depth-of-field focusing of the monocular microscope. This proved to be a difficult, tedious method of alignment check, subject to eyestrain and progressive inaccuracy where many junctions were required. The introduction of steroemicroscopy eliminated the failings noted with monocular viewing, and by incorporating the zoom capability of most of the newer stereomicroscopes, it is possible to view the fiber elements through a broad range of magnification suitable to the preference of the individual welder operator. Eye fatigue is essentially eliminated in stereo viewing, allowing extended operating time at constant operator efficiency. Stereo viewing enhances colinear judgment to a measurable extent and has enabled operators to produce fiber optic junctions having signal losses consistently below an eighth of a decibel.

A subassembly having a pair of accurately spaced apart electrodes is accurately oriented with respect to the interface between the two fibers with the aid of the view provided by the stereomicroscope. Diffuse arc excitation is effected between the electrodes operated in an alternating current mode. The electrode subassembly is mounted to a three-axis micropositioner to allow movement of the diffuse arc with respect to the fibers. This permits concentrated heating in the fiber fusion zone and controlled heating and thermal conditioning after the weld has been made in order to minimize thermal stress and crazing effects in the fused filaments.

A better understanding of the invention will appear after consideration of the following detailed description.

DETAILED DESCRIPTION

Figure 1:
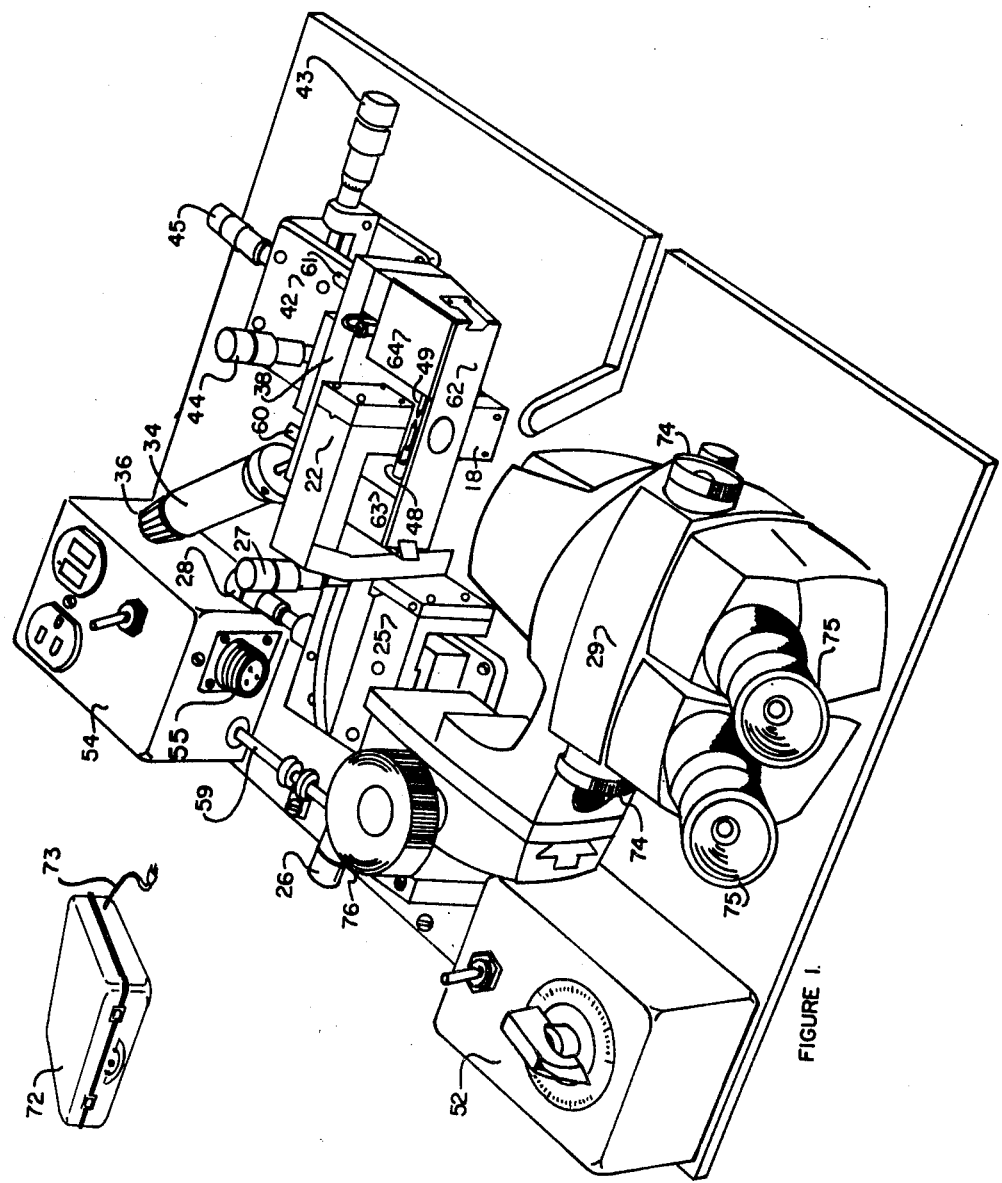
FIGS. 1 and 2 are perspective plan views of a fiber optic welding apparatus in accordance with the invention, FIG. 2 showing the apparatus mounted in a carrying case for field applications.
Figure 2:
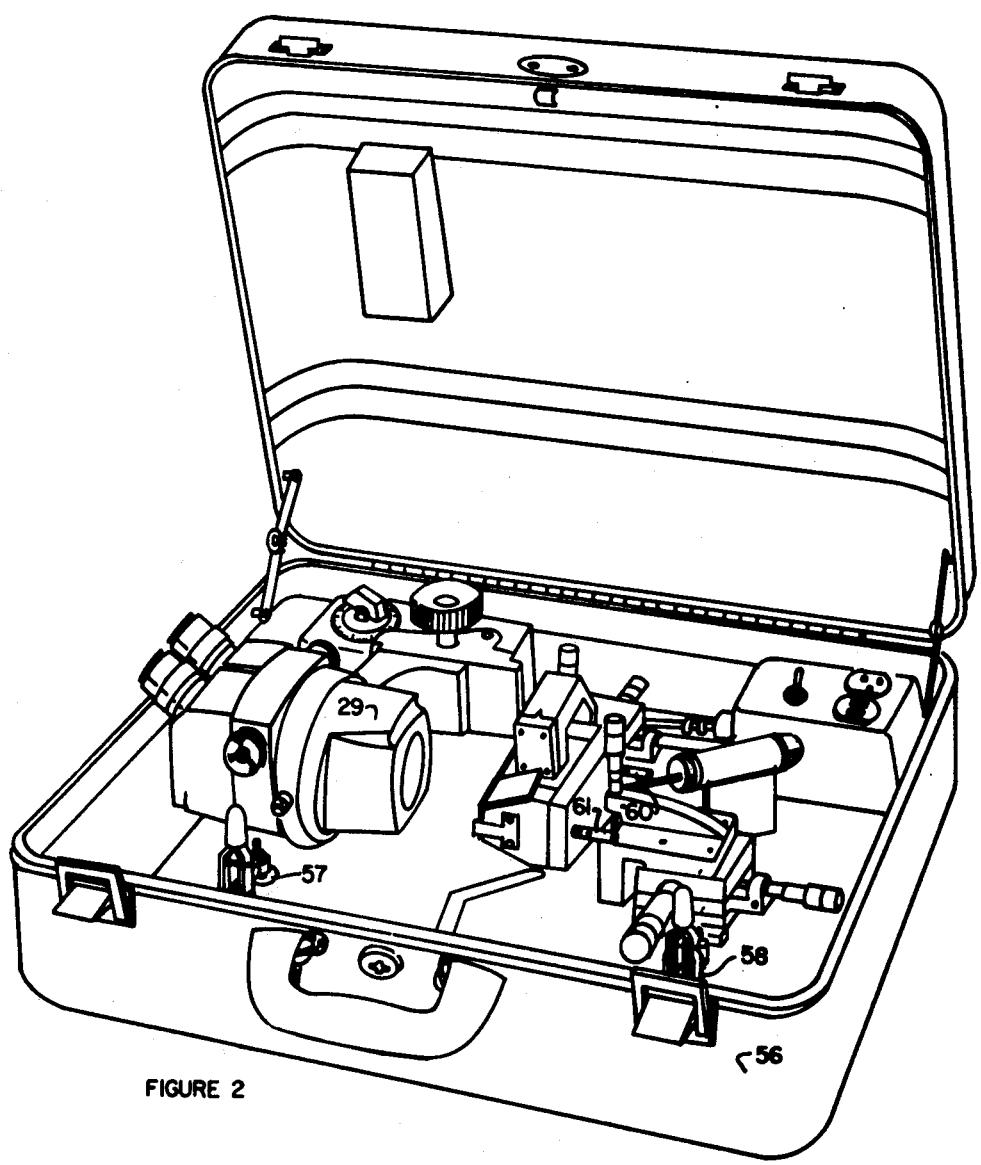
Figure 3:
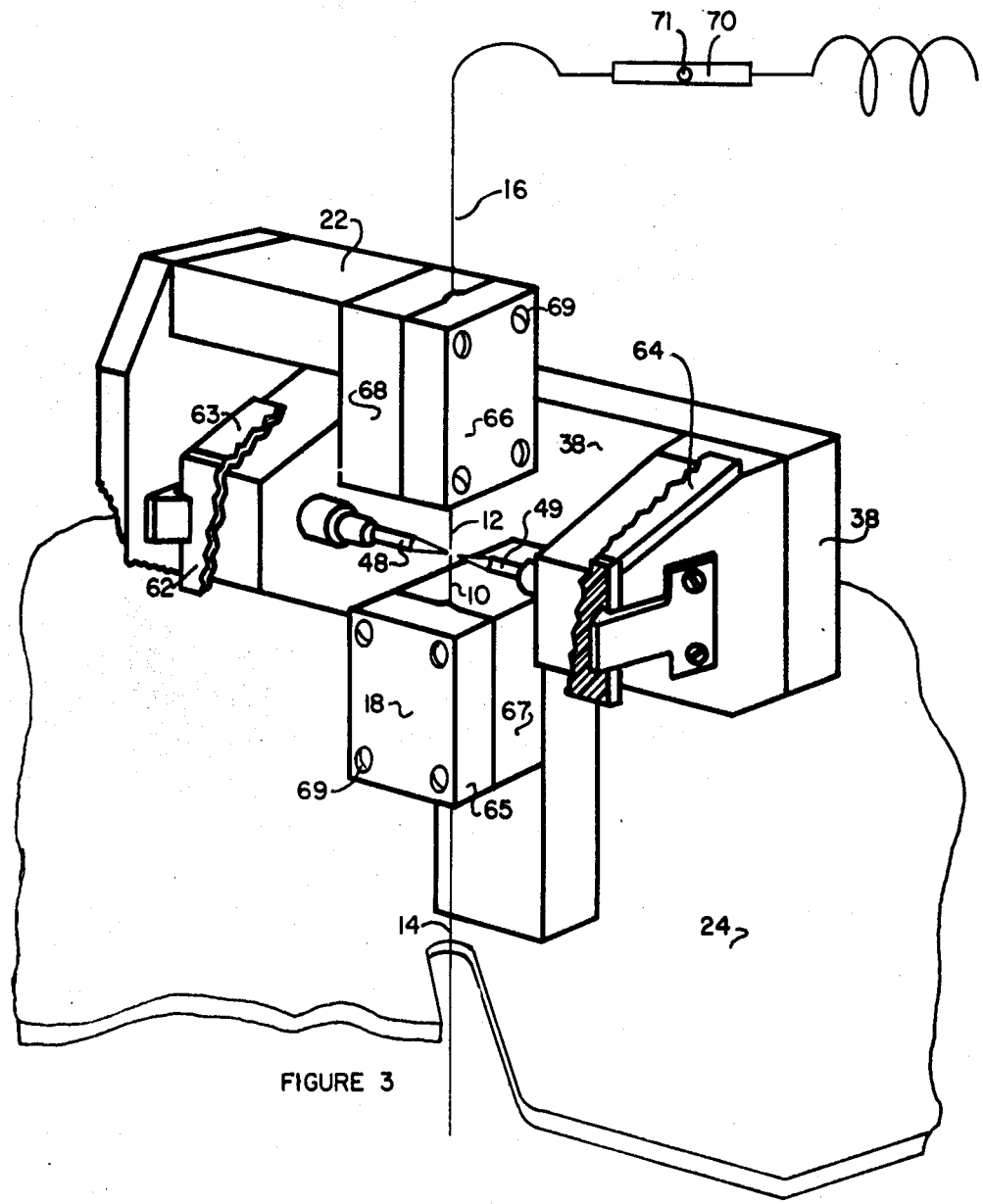
FIG. 3 is an enlarged view of a portion of the apparatus shown in FIGS. 1 and 2 showing the alignment of the ends of two fibers between the welding electrodes.

Referring now to FIGS. 1, 2, and 3, it may be helpful to start with an overview of the apparatus illustrated. In FIG. 3, ends 10 and 12 of optical fiber lengths 14 and 16 are shown colinearly aligned with their axes in vertical orientation by lower filament-holding subassembly 18 and upper filament-holding subassembly 22, respectively. While a gap between ends 10 and 12 is shown in FIG. 3 for purposes of illustration, no gap would exist when alignment of the fibers is completed prior to welding. Lower holding subassembly 18 is fixedly attached directly to base 24, whereas upper holding means 22 is mounted to base 24 through three-axis positioner 25 (FIG. 1) which permits movement of fiber end 12 with three degrees of freedom.

Figure 4:
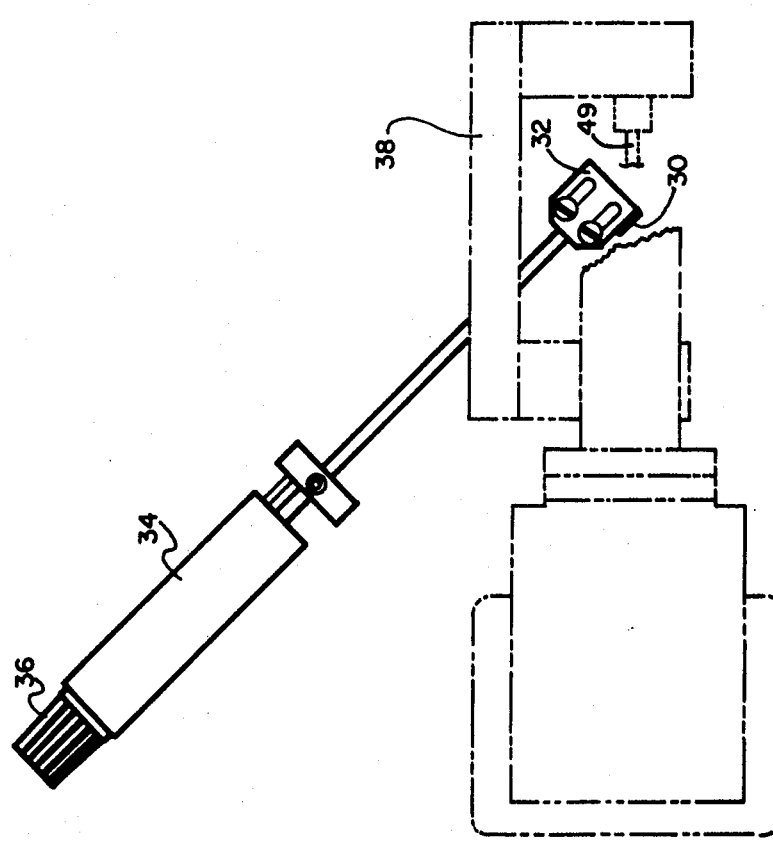
FIG. 4 is a broken-away view showing the mirror and mirror-positioning apparatus.

The precise alignment of fiber end 12 to fiber end 10 in preparation for welding them together is accomplished by the manipulation of x, y, z axis micropositioner controls 26, 27, and 28 by an operator while he views the two fiber ends through stereoscopic microscope 29, shown in FIGS. 1 and 2. A front-surfaced mirror 30, shown in FIG. 4, mounted at a 45° angle with respect to the optical axis of microscope 29 is moved into a position to the right of the junction of fiber ends 10 and 12, not shown in FIG. 4. Electrode subassembly 38, including electrode 49, would first be moved forward of the position shown in phantom lines in FIG. 4 in a manner to be described. Mirror 30 provides a right orthogonal view of the fiber ends, which is seen through stereomicroscope 29 along with the front view. Providing these two orthogonal views of the fiber ends, with equal resolution, greatly facilitates the alignment of the fiber ends. Once colinearity of the two ends is established and they are brought into an abutting relationship, mirror slide 32, upon which mirror 30 is mounted, is withdrawn toward pillow block assembly 34 by manipulation of control knob 36.

Returning now to FIGS. 1 and 3, electrode subassembly 38 is also mounted to a precise, three-axis positioning means 42 having x, y, z controls 43, 44, and 45. This enables the operator to move the pair of electrodes 48 and 49 out of the way during the use of mirror 30 to align the fiber ends and to bring the electrodes into precise alignment with the junction between fiber ends 10 and 12 in preparation for welding the fibers together. Welding is accomplished by a diffuse arc excitation in an alternating current mode between electrodes 48 and 49. Thoriated tungsten electrodes requiring low ignition voltage and providing stable arc operation in the alternating current mode have proven to be quite satisfactory. A part, or all, of the controls for regulating the electrical input to electrodes 10 and 12, such as variable voltage transformer 52 and ground fault circuit box subassembly 54, may be mounted on base 24. In the particular portable embodiment illustrated by the drawings, base 24 and the components mounted thereon are adapted to be fitted within a carrying case 56 (see FIG. 2) and fastened thereto through clamps 57 and 58. In that embodiment, a high-voltage power supply is housed in a separate, portable container 72. Connection between the power supply and the components on base 24 are made via an electrical cable 73 through connector 55 and, in turn, to variable transformer 52 through cable 59 and to electrodes 48 and 49 by suitable cables, not shown, through conductor ends 60 and 61. Output voltages to 15 kV were provided in the illustrated embodiment. Electrical interlocks, not shown, were provided to afford protection to the operator. Transparent protection shields 62, 63, and 64 are also provided for operator safety.

Prior to clamping fiber end 12 into upper filament-holding subassembly 22, a small length of acrylic or other plastic tubing 70 (FIG. 3) is placed on filament 16 and run back away from end 12 a convenient distance. After the welding of the filaments is completed, tubing 70 is positioned over the weld joint and a material such as silicone is injected into the tube through hole 71, drilled at or near the midpoint of the tube. The silicone then provides a satisfactory replacement for the coating on the filaments which is removed during the welding process and immobilizes the fused junction in a firm but pliable manner once the silicone material has cured.

It has been found that it is not actually necessary to "skin" the coating placed upon the filaments during the manufacturing process away from ends 10 and 12 preparatory to welding. Once the arc is initiated between electrodes 48 and 49, the coating is vaporized about 50 to 100 diameters on either side of the junction. The glass fiber filaments (generally ranging from 0.033 inch to 0.008 inch in diameter) are usually coated with an ultrathin sleeving of teflon or one of the tough polymerized plastics (approximately one-quarter to one-half mil in thickness). These coatings are placed over the fiber filament during the manufacturing process subsequent to the drawing of the fiber from the glass blank. The coating thickness is controlled by passing the "just drawn" glass fiber through a concentric extruding die that meters the plastic coating and allows the coating to encase the fiber.

The use of magnetic clamps in filament-holding subassemblies 18 and 22 have proven to be very satisfactory. Removable outer clamping portions 65 and 66 are removed from their respective holding subassemblies by the operator. Filament ends 10 and 12 are then positioned within the longitudinally extending V-shaped notches provided in stationary portions 67 and 68 and clamped therein by the replacement of the removable portions. The removable portions contain adjustable magnetic set screws 69 that allow the operator to accurately position the outer clamping portions to accommodate fiber filament diameters from 0.003 inch to 0.015 inch.

Prior to inserting the fiber elements in the filament-holding subassemblies, the fibers are accurately cleaved to produce flat, clean ends that will facilitate accurate abutment and fusion during welding. Cleaving is accomplished with a precision ground carbide cleaving blade and holder assembly (not part of this invention) that pretensions the fiber and cuts the fiber without fracturing the fiber edges. This has been found to be instrumental in producing clean, accurate fused junctions that do not alter or destroy the graded or stepped index characteristics of the outer portions of the fiber element.

The stereomicroscope discussed in this disclosure and utilized with the welders fabricated to date contains front-end optics that enable the operator to view the fibers and electrode system through a wide and variable range of magnification. With a given set of eyepiece optics, it is possible to view the working field through a "zoom" magnification range from about 2 to 7 simply by adjustment of the zoom knobs 74. The eyepiece optics, 75, provide initial magnification at 10, 15, or 25 power, which requires initial adjustment of knob 76 to allow operation of the zoom optics through the magnification range noted. The broad range of magnification has proven to be attractive by permitting operators to select a magnification range unique to their preference, without undue readjustment of the microscope elements. It has been found that when fusing 125-micron-diameter (0.005-inch) fibers, magnification above 80 power is generally required to assure colinear alignment of the fibers. Generally, magnification above 150 power is not required not advantageous.

While the fundamental novel features of the invention have been shown and described and pointed out as applied to particular embodiments, it will be appreciated by those skilled in the art that various omissions, substitutions, and changes may be made within the principle and scope of the invention as expressed in the appended claims.

What is claimed is:

1. In a system for joining two lengths of a fiber optic waveguide together, apparatus comprising:
   a. A base,
   b. A first clamping means fixedly attached to said base for holding an end of a first length of a fiber optic waveguide in a vertical orientation,
   c. A second clamping means for holding an end of a second length of said fiber movably mounted to said base through a three-axis micropositioner, whereby said fiber ends may be brought into vertical, colinear and abutting alignment,
   d. A stereoscopic microscope for viewing said fiber ends, mounted on said base,
   e. A pair of electrodes mounted to said base through a three-axis micropositioner whereby said electrode pair may be moved into precise alignment with the junction between said fiber ends for welding said fibers and out of the way during alignment of said fiber ends,
   f. A mirror mounted to said base through means permitting said mirror to be moved into and retracted out of a position alongside of the fiber ends and at a 45° angle to the optical axis of said microscope whereby two right orthogonal views of the fiber ends are provided through said microscope while said ends are aligned and the mirror may be moved out of the way during alignment of said electrodes, and
   g. Means for establishing an arc between said electrodes for welding said ends together.

2. The apparatus of claim 1 wherein said base and components mounted thereon are adapted to be fitted within a carrying case.

* * * * *